June 2, 1953 S. W. LONG 2,640,683
FRICTION CATHEAD
Filed Aug. 30, 1948
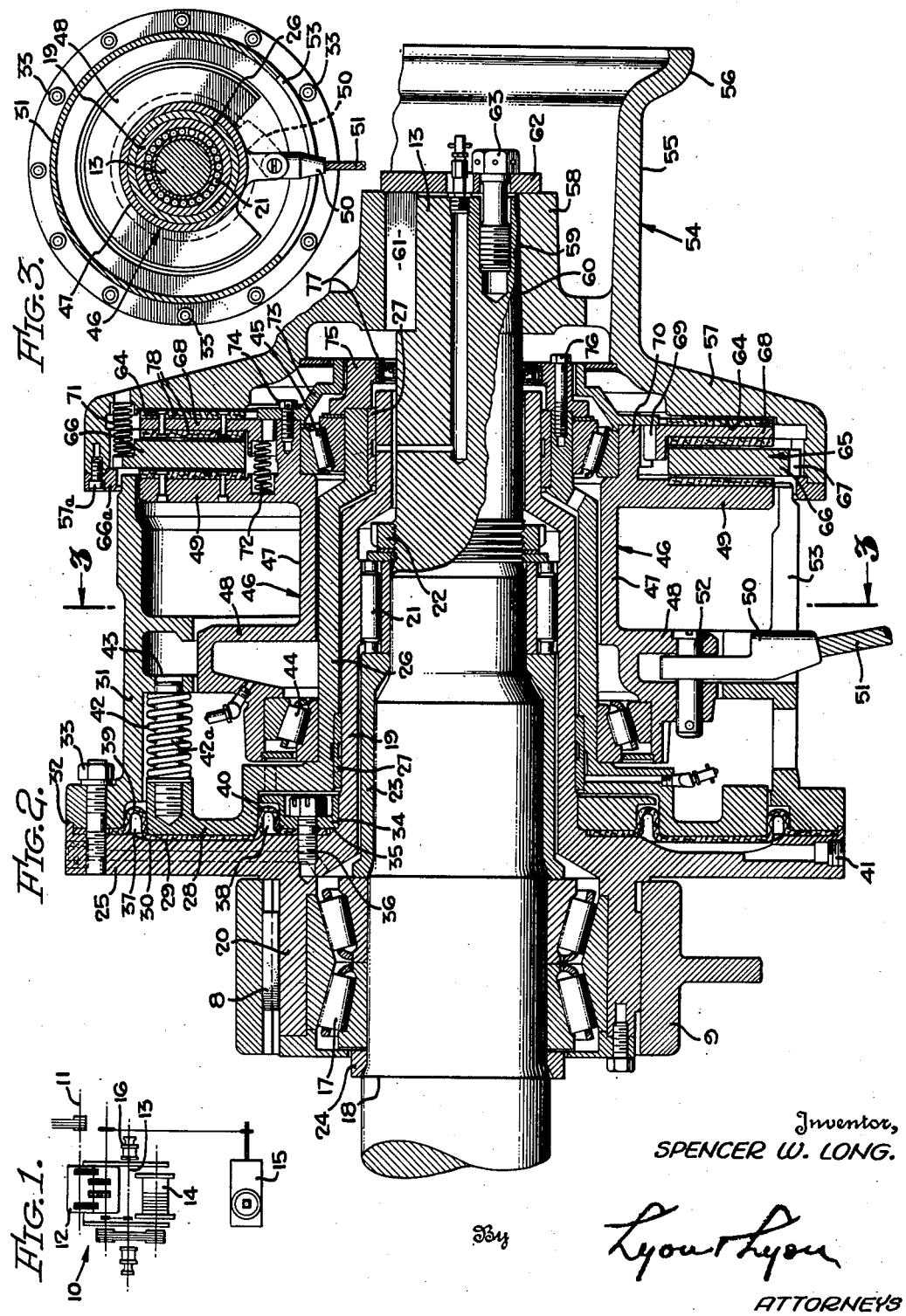
Inventor,
SPENCER W. LONG.
By
Lyon & Lyon
ATTORNEYS Patented June 2, 1953

2,640,683

UNITED STATES PATENT OFFICE 2,640,683

FRICTION CATHEAD

Spencer W. Long, Inglewood, Calif., assignor to
The National Supply Company, Pittsburgh, Pa.,
a corporation of Pennsylvania Application August 30, 1948, Serial No. 46,789

23 Claims. (Cl. 254—187)

This invention relates to well drilling apparatus of the general character used in the rotary process of drilling oil, gas, water and other wells.

This invention finds particular usefulness in connection with line spooling apparatus used in screwing and unscrewing threaded joints of drill pipe and casing. Reference is made to my copending application for "Friction Cathead," filed May 14, 1946, and bearing Serial No. 669,518.

The principal object of this invention is to provide a novel form of line spooling device embodying improvements over the device disclosed in said copending application, and which is particularly useful in spooling a line for making up, breaking out and spinning drill pipe or casing.

Another object is to provide a cathead device of this type having a spooling drum rotatably mounted on a nonrotatable axially shiftable shell which in turn is carried on a stationary sleeve encircling a rotating shaft, the device including the clutch at one side of the drum for driving the drum from the shaft and a pressure operated actuator assembly at the other side of the drum for energizing the clutch.

Another object is to provide a cathead device of this type employing a spooling drum rotatably mounted on an axially shiftable nonrotary shell.

Other objects and advantages of the invention will hereinafter more fully appear.

In the drawings:

Figure 1 is a diagrammatic plan view of a well drilling drawworks and rotary machine showing line spooling devices embodying this invention positioned on the opposite ends of the catshaft of the drawworks.

Figure 2 is a sectional plan view partly broken away showing details of construction of a preferred embodiment of my invention.

Figure 3 is a sectional end view taken substantially on the lines 3—3 as shown in Figure 2.

Referring to the drawings, the drawworks generally designated 10 may be of any conventional type and may include a power driven shaft 11 arranged to drive a change speed transmission 12, the latter being suitably connected to drive a catshaft 13, drawworks drum 14 or rotary machine 15. One or more friction catheads 16 may be mounted on the catshaft 13.

The catheads 16 may be substantial duplicates. The catshaft 13 is supported on axially spaced bearings, one of these bearings being shown in Figure 2 and identified as 17. A shoulder 18 is provided on the shaft 13 adjacent the supporting bearing 17. A stationary sleeve 19 encircles the shaft 13 and is provided with a supporting collar 20 mounted on the bearing 17. A bearing 21 is mounted on the shaft 13 and provides a support for the stationary sleeve 19. The axially spaced bearings 17 and 21 maintain the sleeve 19 in concentric position with respect to the shaft axis. A nut 22 threaded on the shaft 13 clamps the inner races of the bearings 21 and 17 and the spacer collars 23 and 24 against the shoulder 18 on the shaft 13. The supporting collar 20 acts as a bearing housing for the bearing 17 and is supported by the drawworks frame in the conventional manner. A radially extending flange 25 is formed integrally with the stationary sleeve 19 and supporting collar 20. Rotary movement of the sleeve 19, flange 25 and supporting collar 20 is prevented by the key 8 which connects the collar 20 to the drawworks frame 9.

An axially shiftable nonrotary shell 26 encircles the stationary sleeve 19 and is provided with axially spaced bearing pads 27 for slidably supporting the shell 26 on the sleeve 19. A flange 28 is formed integrally with the shell 26 and cooperates with the flange 25 to define a fluid pressure chamber 29 therebetween. A deformable gasket 30 forms a seal for the chamber 29. This gasket is annular in form and is clamped around its outer periphery between the flange 25 and guard 31. Mating faces 32 on the periphery of the flange 25 and guard 31 meet in metal-to-metal contact to limit the initial compression of the gasket 30 effected by means of the bolted connections 33. An annular clamping ring 34 clamps the inner periphery of the gasket 30 against the flange 25, and mating faces 35 on the flange 25 and ring 34 limit the initial compression of the gasket as effected by the clamping bolts 36. Annular pockets 37 and 38 are defined by the flange 25, guard 31, flange 28 and ring 34 to receive annular channels 39 and 40 formed in the gasket 30. An inlet connection 41 for pressure fluid is formed in the flange 25, and pressure fluid thus admitted to the pressure chamber 29 acts to separate the flanges 25 and 28. The arrangement of the channels 39 and 40 in the annular gasket 30 permits relative axial movement of the flanges 25 and 28 with a minimum of distortion of the gasket 30. Compression springs 42 are mounted between a lip 43 on the guard 31 and the flange 28 in a manner to oppose the separation of the flanges under fluid pressure acting in the pressure chamber 29. The springs 42 encircle guide pins 42a which engage within apertures in the lip 43 to prevent the shell from rotating.

Axially spaced bearings 44 and 45 are mounted on the nonrotatable shell 26 and provide a rotary mounting for the spooling drum 46. The bearings 44 and 45 prevent axial movement of the drum 46 relative to the shell 26. The spooling drum 46 is provided with a central cylindrical portion 47 extending between the end flanges 48 and 49. The terminal fitting 50 for the flexible line 51 is pivotally connected to the flange 48 by means of the pivot pin 52. The terminal fitting 50 is adapted in one position to extend outwardly through the window 53 provided in the guard 31 at one side thereof, or is adapted to assume a position as shown by the dotted lines in Figure 3 when the flexible cable 51 is spooled on the cylindrical portion 47 of the spooling drum 46.

A conventional cathead member 54 having the usual spooling surface 55 and end flange 56 may be cast integrally with the ring member 57 which is provided with a hub 58. The hub 58 is provided with a conical bore 59 adapted to be received on the tapered end surface or abutment 60 of the shaft 13. A key 61 prevents relative rotary movement between the shaft 13 and the hub 58. An end plate 62 secured to the extreme end of the shaft by means of the cap screws 63 prevents disassembly of the hub from the tapered end 60 of the shaft 13. The ring 57 is provided with a radial surface 64, and the friction drive elements generally designated 65 are interposed between the end flange 49 on the spooling drum 46 and the radial surface 64 on the ring 57. As shown in the drawings these friction drive elements include a clutch disk 66 connected by spline means 67 at its outer periphery for slidable but nonrotary engagement with the ring 57. Another clutch disk 68 is connected by spline means 69 at its inner periphery to an extension 70 formed on the spooling drum 46. Compression springs 71 are provided for axially separating the disk 66 from the radial surface 64 on the ring 57. Additional compression springs 72 are provided for separating the disk 68 from the flange 49 of the spooling drum. A collar 73 attached to the spooling drum extension 70 by means of the cap screws 74 underlies a portion of the disk 68 so that movement of the spooling drum 46 to the left as viewed in Figure 2 causes the disk 68 to move away from the radial surface 64. The collar 73 also serves to hold the outer race of the bearing 45 in position in the spooling drum 46. The inner race of the bearing 45 is held in place on the shell 26 by means of collar 75 and cap screws 76. A grease seal assembly 77 carried by the collar 75 engages the surface of the shaft 13.

Friction lining 78 may be attached on both sides of the disk 68 and may be secured to the drum flange 49 by any conventional means. It will be observed that the friction lining can be removed and replaced without removing the entire unit from the catshaft 13. In order to replace the lining the plate 62 is removed and the cap screws 57a unthreaded to permit axial disassembly of the ring 57. The collar 73 is taken off and the disks 66 and 68 may then be dismantled in an axial direction. The spooling drum 46 need not be removed from the remainder of the assembly since the friction lining on the end flange 49 is then available for inspection and replacement.

In operation the catshaft 13 is rotated under power from the transmission 12 and turns within the supporting bearing 17. The sleeve 19 and shell 26 do not rotate, and accordingly there is no tendency for the spooling drum 46 to rotate by reason of frictional drag of bearings on a rotating shaft. Therefore, the drum 46 normally remains at rest even though the shaft 13 may be constantly rotating. In order to turn the spooling drum 46 fluid under pressure is admitted into the inlet fitting 41 and into the pressure chamber 29. The fluid is sealed within the chamber by the gasket 30, and the fluid pressure moves the flange 28 and thrust-transmitting shell 26 to the right as viewed in Figure 1 against the force of the compression springs 42. The spooling drum 46 is carried axially with the bearings 44 and 45 on the shell 26 to clamp the friction drive elements 65 between the drum flange 49 and the radial surface 64 on the rim 57. The end thrust exerted by the pressure fluid in the chamber 29 is transmitted through the flange 28, bearing 44, drum 46, and through friction elements 49, 66, and 68 to the ring 57 and shaft 13. The reaction thrust from the chamber 29 passes through the flange 25 and supporting collar 20. The thrust is then carried through the radial and thrust bearing 17 to the shoulder 18 on the shaft. The end thrust on the ring 57 is applied against the end plate 62 and transmitted to the shaft by way of the cap screws 63. It is thus apparent that the forces developed in the pressure chamber 29 do not apply resulting end load to the shaft, but on the contrary, the axial forces are balanced out against the end plate 62 and shoulder 18. It will also be observed that the supporting bearing 17 serves two functions, that is, to provide a rotary bearing for supporting the shaft and also to absorb end thrust imposed by the flange 25.

Frictional engagement between the lining 78 and the disk 66 and between the lining 78 and the radial surface 64 supplies sufficient torque to turn the spooling drum 46 for make up or break out of threaded joints in casing or drill pipe with the use of conventional tongs. The drum 46 may also be driven to spool in the flexible line 51 in order to operate a spinning line (not shown) which is wrapped around one pipe in order to spin up a threaded connection with another pipe, as will be understood by those skilled in the art.

When it is desired to cease driving the spooling drum 46, the fluid pressure in the chamber 29 is relaxed, permitting the return springs 42 to shift the shell 26 and drum 46 toward the left as viewed in Figure 2, and hence interrupt the friction drive through the elements 65. The retaining flange 66a connected to the ring 57 by cap screws 57a acts to limit the return travel of the clutch plate 66.

Having fully described my invention, it is to be understood that I do not wish to be limited to the details herein set forth, but my invention is of the full scope of the appended claims.

I claim:

1. In a device of the class described for use with a rotatable shaft, the combination of a stationary sleeve encircling a portion of the shaft and provided with a flange; an axially movable shell encircling a portion of the sleeve; a flange on said shell, said flanges defining a fluid pressure chamber therebetween; an axially immovable ring adapted to be secured on the shaft; a spooling drum rotatably mounted on the shell between said fluid pressure chamber and said ring; the drum being held against axial movement relative to the shell; and friction drive means operatively interposed between said ring and a portion of said drum establishing a releasable driving connection between the shaft and the spooling drum upon axial movement of the spooling drum; and means to introduce fluid into the pressure chamber to move the shell axially.

2. In a device of the class described for use with a rotatable shaft, the combination of a stationary sleeve encircling a portion of the shaft and provided with a flange; an axially movable shell encircling a portion of the sleeve; a flange on said shell, said flanges defining a fluid pressure chamber therebetween; an axially immovable ring adapted to be secured on the shaft; a spooling drum rotatably mounted on the shell between said fluid pressure chamber and said ring and having an end flange; the drum being held against axial movement relative to the shell; and friction drive means operatively interposed between said ring and a portion of said drum establishing a releasable driving connection between the shaft and the spooling drum flange upon axial movement of the spooling drum; and means to introduce fluid into the pressure chamber to move the shell axially.

3. In a device of the class described for use with a rotatable shaft, the combination of a stationary sleeve encircling a portion of the shaft and provided with a flange; an axially movable shell encircling a portion of the sleeve; a flange on said shell; an annular deformable gasket between said flanges defining a fluid pressure chamber therebetween; an axially immovable ring adapted to be releasably secured on the shaft; a spooling drum rotatably mounted on the shell between said fluid pressure chamber and said ring; the drum being held against axial movement relative to the shell; and friction drive means interposed between said ring and a portion of said drum establishing a releasable driving connection between the shaft and the spooling drum upon axial movement of the spooling drum; and means to introduce fluid into the pressure chamber to move the shell axially.

4. In a device of the class described for use with a rotatable shaft, the combination of a stationary sleeve encircling a portion of the shaft and provided with a flange; an axially movable shell encircling a portion of the sleeve; a flange on said shell; an axially immovable ring adapted to be secured on the shaft; a spooling drum rotatably mounted on the shell between said shell flange and said ring; the drum being held against axial movement relative to the shell; friction drive means operatively interposed between said ring and a portion of said drum establishing a releasable driving connection between the shaft and the spooling drum upon relative axial movement therebetween; and fluid pressure means operable to separate the flanges whereby the shell may move the drum axially to energize the friction drive means.

5. In a device of the class described for use with a rotatable shaft, the combinaion of a stationary sleeve encircling a portion of the shaft and provided with a flange; axially spaced bearings for supporting the sleeve on said shaft; an axially movable shell encircling a portion of the sleeve; axially spaced bearings for slidably supporting the shell on the sleeve; a flange on said shell, said flanges defining a fluid pressure chamber therebetween; an axially immovable ring adapted to be secured on the shaft; a spooling drum rotatably mounted on the shell between said fluid pressure chamber and said ring; axially spaced bearings for supporting the spooling drum upon the shell and maintaining it against axial movement relative thereto; and friction drive means operatively interposed between said ring and a portion of said drum establishing a releasable driving connection between the shaft and the spooling drum upon axial movement of the spooling drum; and means to introduce fluid into the pressure chamber to move the shell axially.

6. In combination, a rotatable shaft having a shoulder and an axially spaced abutment; a stationary sleeve encircling a portion of the shaft between the shoulder and abutment; a thrust bearing operatively interposed between the sleeve and said shoulder; a flange on the stationary sleeve; an axially movable element slidably mounted with respect to said flange and defining a fluid pressure chamber therebetween; a thrust-transmitting axially movable shell fixed relative to said element and encircling a portion of the stationary sleeve; an axially immovable ring secured relative to the shaft against said abutment; a spooling drum rotatably mounted on the shell between the fluid pressure chamber and said ring; and friction drive means operatively positioned between said ring and a portion of said drum establishing a releasable driving connection between the shaft and the spooling drum upon axial movement of the spooling drum; and means to introduce fluid into the pressure chamber to move the shell axially.

7. In combination, a rotatable shaft having a shoulder and an axially spaced abutment; a stationary sleeve encircling a portion of the shaft between the shoulder and abutment; a thrust bearing operatively interposed between the sleeve and said shoulder; a flange on the stationary sleeve; an axially movable element slidably mounted with respect to said flange and defining a fluid pressure chamber therebetween; a thrust-transmitting axially movable shell fixed relative to said element and encircling a portion of the stationary sleeve; an axially immovable ring secured relative to the shaft against said abutment; a spooling drum rotatably mounted on the shell between the fluid pressure chamber and said ring and having an end flange; the drum being held against axial movement relative to the shell; bearing means slidably supporting the shell upon said sleeve; and friction drive means operatively positioned between said drum flange and said ring establishing a releasable driving connection between the shaft and the spooling drum upon axial movement of the spooling drum; and means to introduce fluid into the pressure chamber to move the shell axially.

8. In combination, a rotatable shaft having a shoulder and an axially spaced abutment; a stationary sleeve encircling a portion of the shaft between the shoulder and abutment; a thrust bearing operatively interposed between the sleeve and said shoulder; a flange on the stationary sleeve; an axially movable element slidably mounted with respect to said flange and defining a fluid pressure chamber therebetween; a thrust-transmitting axially movable shell fixed relative to said element and encircling a portion of the stationary sleeve; axially spaced bearings for slidably supporting the shell on said sleeve; an axially immovable ring secured relative to the shaft against said abutment; a spooling drum rotatably mounted on the shell between the fluid pressure chamber and said ring; axially spaced bearings supporting the drum upon the shell; the drum being held against axial movement relative to the shell; and friction drive means operatively positioned between said ring and a portion of said drum establishing a releasable driving connection between the shaft and the spooling drum upon axial movement of the spooling drum; and means to introduce fluid into the pressure chamber to move the shell axially.

9. In combination, a rotatable shaft having a shoulder and an axially spaced abutment; a supporting bearing for the shaft adjacent the shoulder; a stationary sleeve member encircling a portion of the shaft between the shoulder and abutment and carried at one end on the supporting bearing; a flange on the stationary sleeve member; an axially movable element slidably mounted with respect to said flange and defining a fluid pressure chamber therebetween; a thrust-transmitting axially movable shell fixed relative to said element and encircling a portion of the stationary sleeve member; an axially immovable ring secured relative to the shaft against said abutment; a spooling drum rotatably mounted on the shell between the fluid pressure chamber and said ring; friction drive means operatively positioned between said ring and a portion of said drum establishing a releasable driving connection between the shaft and the spooling drum; and means for introducing fluid into the pressure chamber to shift the shell axially for energizing the friction drive means.

10. A friction cathead device adapted to be positioned on the overhanging end of a rotatable shaft, comprising in combination an axially shiftable nonrotatable shell encircling the shaft and provided with spaced bearings; a spooling drum having an end flange and rotatably mounted upon said bearings; a stationary sleeve encircling the shaft and provided with spaced bearings for slidably supporting the shell thereon; a ring removably fixed on the end of the shaft at one end of the shell; friction drive means interposed between the drum flange and the ring; and fluid pressure means at the other end of the shell for moving the shell and drum axially relative to the sleeve to energize said friction drive means.

11. In a device of the class described, the combination of a rotary member, a stationary sleeve encircling a portion of the rotary member, a spooling drum, means including bearing means for supporting the spooling drum on the sleeve for rotation and for axial movement, the sleeve having a radially extending flange at one side of the spooling drum, an axially movable thrust-applying element cooperating with the flange to define an annular pressure chamber therebetween, an axially immovable ring fixed to the rotary member on the other side of the spooling drum, friction drive means operatively interposed between said ring and a portion of said spooling drum establishing a releasable driving connection between the rotary member and the spooling drum upon axial movement of the spooling drum, means to introduce fluid into the pressure chamber to move the thrust-applying element axially, and means whereby said element may move the spooling drum axially to engage the friction drive means.

12. In a device of the class described, the combination of a rotary member, a stationary sleeve encircling a portion of the rotary member, a spooling drum having an end flange, means including bearing means for supporting the spooling drum on the sleeve for rotation and for axial movement, the sleeve having a radially extending flange at one side of the spooling drum, an annular flexible diaphragm fixed on its inner and outer periphery to said sleeve flange and cooperating therewith to form an expansible pressure chamber, an axially movable thrust-transmitting element engaged by said diaphragm, an axially immovable ring fixed to the rotary member on the other side of the spooling drum, friction drive means operatively interposed between said ring and the flange of said spooling drum establishing a releasable driving connection between the rotary member and the spooling drum upon axial movement of the spooling drum, means to introduce fluid into the pressure chamber to move the thrust-transmitting element axially, and means whereby said element may move the spooling drum axially to engage the friction drive means.

13. In a device of the class described for use with a rotatable shaft, the combination of a stationary sleeve encircling a portion of the shaft and provided with a flange; an axially movable shell encircling a portion of the sleeve; a flange connected to said shell, said flanges defining a fluid pressure chamber therebetween; an axially immovable ring adapted to be secured on the shaft; a spooling drum rotatably mounted on the shell between said fluid pressure chamber and said ring; the drum being held against axial movement relative to the shell; and friction drive means operatively interposed between said ring and a portion of said drum establishing a releasable driving connection between the shaft and the spooling drum upon axial movement of the spooling drum; and means to introduce fluid into the pressure chamber to move the shell axially.

14. In a device of the class described for use with a rotatable shaft, the combination of a stationary sleeve encircling a portion of the shaft and provided with a flange; an axially movable shell encircling a portion of the sleeve; a flange connected to said shell; an axially immovable ring adapted to be secured on the shaft; a spooling drum rotatably mounted on the shell between the shell flange and said ring; the drum being held against axial movement relative to the shell; friction drive means operatively interposed between said ring and a portion of said drum establishing a releasable driving connection between the shaft and the spooling drum upon relative axial movement therebetween; and fluid pressure means operable to separate the flanges whereby the flange connected to the shell may move the drum axially to energize the friction drive means.

15. In a cable drum device connected to and driven by a rotatable shaft, the combination of a rotatable sleeve fixed to the shaft, a non-rotatable sleeve surrounding the rotatable sleeve, a drum, means journalling the drum on the non-rotatable sleeve, means for causing relative axial movement between the drum and non-rotatable sleeve, means including a clutch part operatively connected to the shaft, a clutch part on the drum, a disk interposed between the clutch parts, yieldable means between the clutch parts tending to separate the disk from contact with the clutch parts upon release of the means for causing axial movement of the drum, and means for limiting the axial movement of the disk and friction parts in opposite directions for limited spacing therebetween.

16. In a cathead device of the class described, the combination of: a rotary drive member, a non-rotary tubular member encircling a portion of the rotary drive member, a radially extending flange fixed on the tubular member, the tubular member and flange being axially movable, an axially immovable member cooperating with the tubular member to define an annular fluid pressure chamber therebetween, an axially immovable ring fixed on the rotary drive member, a spooling drum rotatably mounted on the tubular member and positioned between the flange and the ring, the drum being held against axial movement relative to the tubular member, friction drive means operatively interposed between said ring and a portion of said drum for establishing a releasable driving connection between the rotary drive member and the spooling drum upon axial movement of the spooling drum, and means to introduce fluid under pressure into the chamber to move the tubular member and spooling drum axially.

17. In a cathead device of the class described, the combination of: a rotary drive member, a non-rotary tubular member encircling a portion of the rotary drive member, a radially extending flange fixed on the tubular member, the tubular member and flange being axially movable, an axially immovable member cooperating with the tubular member to define an annular fluid pressure chamber therebetween, an axially immovable ring fixed on the rotary drive member, a spooling drum rotatably mounted on the tubular member and positioned between the flange and the ring, the drum being held against axial movement relative to the tubular member, a friction disk operatively interposed between said ring and a portion of said drum, and means to introduce fluid under pressure into the chamber to move the tubular member and spooling drum axially and thereby clamp the friction disk between the ring and the drum.

18. In a cathead device of the class described, the combination of: a rotary drive member, a non-rotary tubular member encircling a portion of the rotary drive member, a radially extending flange fixed on the tubular member, the tubular member and flange being axially movable, an axially immovable member cooperating with the tubular member to define an annular fluid pressure chamber therebetween, an axially immovable ring fixed on the rotary drive member, a spooling drum rotatably mounted on the tubular member and positioned between the flange and the ring, the drum being held against axial movement relative to the tubular member, a friction disk fixed on a portion of said drum, and means to introduce fluid under pressure into the chamber to move the tubular member and spooling drum axially to bring the friction disk into engagement with said ring.

19. In a cathead device of the class described, the combination of: a rotary drive member, a non-rotary tubular member encircling a portion of the rotary drive member, a radially extending flange fixed on the tubular member, the tubular member and flange being axially movable, an axially immovable member cooperating with the tubular member to define an annular fluid pressure chamber therebetween, a thrust bearing operatively interposed between the axially immovable member and said rotary drive member, an axially immovable ring fixed on the rotary drive member, a spooling drum, means including thrust bearing means rotatably mounting the spooling drum on the tubular member between the flange and the ring, friction drive means operatively interposed between said ring and a portion of said drum for establishing a releasable driving connection between the rotary drive member and the spooling drum upon axial movement of the spooling drum, and means to introduce fluid under pressure into the chamber to move the tubular member and spooling drum axially.

20. In a device of the class described for use with a rotatable shaft, the combination of: a stationary sleeve encircling a portion of the shaft and provided with a flange, an axially movable assembly carried on the stationary sleeve, the assembly including a rotary spooling drum and a nonrotary thrust-transmitting element and thrust bearing means operatively interposed between said element and said drum, said thrust-transmitting element and said flange cooperating to define a fluid pressure chamber therebetween, an axially immovable ring secured relative to the shaft, friction drive means operatively interposed between said ring and a portion of said spooling drum establishing a releasable driving connection between the shaft and the spooling drum upon axial movement of the spooling drum, and means to introduce fluid into the pressure chamber to move said assembly axially.

21. In a device of the class described, the combination of: a rotary member, a stationary sleeve encircling a portion of the rotary member, an axially movable assembly carried on the stationary sleeve, the assembly including a rotary spooling drum and a nonrotary thrust-transmitting element and thrust bearing means operatively interposed between said element and said drum, the stationary sleeve having a radially extending flange at one side of the spooling drum, an annular flexible diaphragm fixed on its inner and outer periphery to said sleeve flange and cooperating therewith to form an expansible pressure chamber, the diaphragm contacting said thrust-transmitting element to move said assembly axially, an axially immovable ring fixed to the rotary member on the other side of the spooling drum, the spooling drum having a flange, friction drive means operatively interposed between said ring and the spooling drum flange establishing a releasable driving connection between the rotary member and the spooling drum upon axial movement of the spooling drum, and means to introduce fluid into said pressure chamber.

22. In a cable drum device, the combination with a rotatable driving member of a nonrotatable sleeve surrounding a portion of the rotatable driving member and having means fixing said sleeve against rotation, a cable drum, means carried on the nonrotatable sleeve for rotatably supporting the drum, means for causing relative axial movement between the drum and the nonrotatable sleeve, means forming opposed clutch faces on the drum and the rotatable driving member, a friction member interposed between said clutch faces in position for clutch engagement upon said axial movement, a disk interposed between said friction member and one of said clutch faces and movable axially relative thereto, and yieldable means interposed between the clutch faces and the respective friction member and disk tending to separate said friction member and disk from the clutch faces and each other upon release of the axial movement means.

23. In a clutch device, a rotatable shaft having a flange mounted thereon, a toothed rim mounted on said flange, a toothed friction disk interconnected with said toothed rim and rotatable therewith and axially movable with respect thereto, a nonrotatable member encircling the shaft and positioned for supporting an axially movable flange member that is positioned on one side of said friction disk and carrying a toothed hub, a toothed clutch plate interengaging said toothed hub and positioned on the opposite side of said friction disk from said axially movable flange, means for applying pressure to said axially movable flange to cause interengagement with said friction disk, said clutch disk, and said flange mounted on said rotatable shaft so as to cause rotation of said axially movable flange, and yieldable means interposed between said flange carrying said toothed rim and said friction disk and between said axially movable flange and said clutch disk so as to separate the adjacent faces of the respective members upon the release of said axially movable flange.

SPENCER W. LONG.

References Cited in the file of this patent

UNITED STATES PATENTS

| Number | Name | Date |
|---|---|---|
| 2,328,133 | Foster | Aug. 31, 1943 |